(12) United States Patent
Kitagawa et al.

(10) Patent No.: US 10,535,474 B2
(45) Date of Patent: Jan. 14, 2020

(54) POROUS COORDINATION POLYMER-IONIC LIQUID COMPOSITE

(71) Applicants: Kyoto University, Kyoto-shi, Kyoto (JP); KYOCERA Corporation, Kyoto-shi, Kyoto (JP)

(72) Inventors: Hiroshi Kitagawa, Kyoto (JP); Teppei Yamada, Kyoto (JP); Kazuyuki Fujie, Kirishima (JP)

(73) Assignee: KYOTO UNIVERSITY, Kyoto-Shi, Kyoto (JP)

( * ) Notice: Subject to any disclaimer, the term of this patent is extended or adjusted under 35 U.S.C. 154(b) by 914 days.

(21) Appl. No.: 14/381,816

(22) PCT Filed: Mar. 19, 2013

(86) PCT No.: PCT/JP2013/057756
§ 371 (c)(1),
(2) Date: Aug. 28, 2014

(87) PCT Pub. No.: WO2013/161452
PCT Pub. Date: Oct. 31, 2013

(65) Prior Publication Data
US 2015/0004499 A1 Jan. 1, 2015

(30) Foreign Application Priority Data
Apr. 23, 2012 (JP) ................. 2012-098134

(51) Int. Cl.
*H01G 11/56* (2013.01)
*H01M 10/0565* (2010.01)

(52) U.S. Cl.
CPC ........ *H01G 11/56* (2013.01); *H01M 10/0565* (2013.01); *H01M 2300/0088* (2013.01)

(58) Field of Classification Search
None
See application file for complete search history.

(56) References Cited

U.S. PATENT DOCUMENTS

2001/0041290 A1* 11/2001 Morigaki ................ H01M 2/16
429/212
2005/0255769 A1* 11/2005 Henninge .............. D06M 11/45
442/59
(Continued)

FOREIGN PATENT DOCUMENTS

EP 2034546 A1 3/2009
JP 2006-281105 A 10/2006
(Continued)

OTHER PUBLICATIONS

ChemTube3D.com. "MOF-5 (or IRMOF-1) Metal Organic Framework". http://www.chemtube3d.com/solidstate/MOF-MOF5.html. Accessed Dec. 6, 2016.*
(Continued)

*Primary Examiner* — Haroon S. Sheikh
(74) *Attorney, Agent, or Firm* — Volpe and Koenig, P.C.

(57) ABSTRACT

A porous coordination polymer-ionic liquid composite according to the present invention includes an insulating structure composed of a porous coordination polymer, and an ionic liquid retained inside pores of the porous coordination polymer. The porous coordination polymer preferably has a main chain containing a typical metal element.

12 Claims, 8 Drawing Sheets

(56) References Cited

U.S. PATENT DOCUMENTS

| | | | |
|---|---|---|---|
| 2005/0287441 A1* | 12/2005 | Passerini | H01B 1/122 429/307 |
| 2008/0261101 A1 | 10/2008 | De Figueiredo Gomes et al. | |
| 2010/0233551 A1 | 9/2010 | Ogawa et al. | |
| 2012/0077092 A1 | 3/2012 | Lee et al. | |

FOREIGN PATENT DOCUMENTS

| | | |
|---|---|---|
| JP | 2006-348085 A | 12/2006 |
| JP | 2008-4533 A | 1/2008 |
| JP | 2011-228114 A | 11/2011 |

OTHER PUBLICATIONS

Wiers. "A Solid Lithium Electrolyte via Addition of Lithium Isopropoxide to a Metal-Organic Framework with Open Metal Sites." Journal of American Chemical Society. 2011, 133, 37, 14522-14525. (Year: 2011).*

Chen, Y., et al, "Ionic Liquid/Metal-Organic Framework Composite for CO2 Capture: A Computational Investigation," Journal of Physical Chemistry (2011), 115 (44), 21736-42.

Singh, MP, et al., "Properties of Ionic Liquid Confined in Porous Silica Matrix," ChemPhysChem, 11 (9) (2010), 2036-43.

Chen, S., et al, "Transition of Ionic Liquid [bmim][PF6] from Liquid to High-Melting-Point Crystal When Confined in Multiwalled Carbon Nanotubes," JACS Communications, Feb. 9, 2007, 2416-17.

Kanakubo, M. et al., "Melting point depression of ionic liquids confined in nanospaces," Chem. Commun., 2006, 1828-30.

International Search Report, PCT/JP2013/057756, dated May 10, 2013, 2 pgs.

Extended European Search Report, European Patent Application No. 13780742.6, dated Nov. 9, 2015, 10 pgs.

Bureekaew, Sareeya, et al., "One-dimensional imidazole aggregrate in aluminium porous coordination polymers with high proton conductivity," Nature Materials, vol. 8, No. 10, Sep. 6, 2009 (Sep. 6, 2009), pp. 831-836.

* cited by examiner

POROUS COORDINATION POLYMER-IONIC LIQUID COMPOSITE

FIELD OF INVENTION

The present invention relates to a composite of a porous coordination polymer with pores and an ionic liquid. For example, the present invention relates to the composite serving as an electrolyte for an electrochemical device operable safely in a wide temperature range.

BACKGROUND

It has been proposed to apply an ionic liquid owing to high ionic conductivity thereof to an electrochemical device as an electrolyte for a battery or an electrical double-layer capacitor. The ionic liquid has extremely high flame retardance, and hence when used as the electrolyte for the electrochemical device, there is no need for a combustible organic solvent, thus ensuring the electrochemical device with high safety.

The ionic liquid generally denotes salts having a melting point of 100° C. or less. The ionic liquids generally have higher melting points than an organic solvents, and some ionic liquids are frozen at room temperature, thus often failing to serve as the electrolyte for the electrochemical device. To allow the ionic liquid to serve as the electrolyte even at or below room temperature, a method has been proposed in which an ionic liquid is filled with or injected into nanopores of porous glass so as to decrease the melting point of the ionic liquid (patent document 1). A correlation between the size of nanopores and the melting point of the filled ionic liquid has also been reported (non-patent document 1). As a material with micropores having a smaller size than nanopores, the case of filled ionic liquid with a carbon nanotube has also been reported (non-patent document 2).

However, it is difficult to further decrease the pore diameter of the porous glass described in the patent document 1 than that of mesopores of approximately 75 Å. Therefore, when the ionic liquid is filled with the pores of the porous glass, the melting point of the ionic liquid is lowered by approximately 30° C. The term "mesopores" denotes pores having a diameter of 20 to 500 Å.

With the non-patent document 2, the ionic liquid is filled with the carbon nanotube with micropores having a further smaller pore diameter, that is, pores having a diameter of 2 nm or less. However, the carbon nanotube has electrical conductivity and hence cannot be used as the electrolyte for the electrochemical device.

According to the purpose of use, it may be desired to increase the melting point of the ionic liquid. With the non-patent document 2, the melting point of the ionic liquid is increased by filling the ionic liquid with the carbon nanotube. However, none of these documents describes the case where the ionic liquid is filled with a material having no electrical conductivity so as to increase the melting point.

PRIOR ART DOCUMENTS

Patent Document

Patent Document 1: Japanese Unexamined Patent Publication No. 2006-281105

Non-Patent Documents

Non-patent Document 1: M. Kanakubo et. al., Chemical Communications, 2006, issue 17, 1828-1830

Non-patent Document 2: S. Chen et. al., Journal of the American Chemical Society, 2007, vol. 129, issue 9, 2416-2417

SUMMARY

Problems to be Solved by the Invention

An object of the present invention is to provide a composite containing an ionic liquid, which serves as, for example, an electrolyte for an electrochemical device operable safely in a wide temperature range.

Means for Solving the Problems

Through extensive research for solving the above problem, the present inventors have succeeded in finding a means for solution comprised of the following configuration, thereby completing the present invention.

(1) A porous coordination polymer-ionic liquid composite including an insulating structure composed of a porous coordination polymer, and an ionic liquid retained inside pores of the porous coordination polymer.

(2) The porous coordination polymer-ionic liquid composite according to (1), in which the porous coordination polymer contains a metal ion as a Lewis acid and an organic ligand as a Lewis base, and the Lewis acid and the Lewis base are any one of a combination of a hard acid and a hard base, a combination of a soft acid and a soft base, and a combination of an intermediate acid and an intermediate base according to HSAB principle.

(3) The porous coordination polymer-ionic liquid composite according to the first or second aspect, in which the porous coordination polymer does not include a coordinatively unsaturated site.

(4) The porous coordination polymer-ionic liquid composite according to any one of the first to third aspects, in which the porous coordination polymer has a main chain containing a typical metal element.

(5) The porous coordination polymer-ionic liquid composite according to the fourth aspect, in which the typical metal element is Zn or Al.

(6) The porous coordination polymer-ionic liquid composite according to any one of the first to fifth aspects in which the structure has a film shape.

(7) The porous coordination polymer-ionic liquid composite according to any one of the first to fifth aspects, in which the structure has a particle shape.

(8) The porous coordination polymer-ionic liquid composite according to any one of the first to fifth aspects, in which the structure is a molded body including a plurality of particles composed of the porous coordination polymer.

(9) The porous coordination polymer-ionic liquid composite according to the eighth aspect, in which the molded body includes a plurality of voids respectively formed between the particles, and at least a part of the voids includes an ion conductive material.

(10) The porous coordination polymer-ionic liquid composite according to the ninth aspect, in which the ion conductive material is an ionic liquid.

(11) The porous coordination polymer-ionic liquid composite according to the ninth or tenth aspect, in which the ion conductive material is an ionic liquid identical to the ionic liquid retained inside the pores.

Effect of the Invention

With the present invention, the ionic liquid is retained inside the pores of the porous coordination polymer so as to ensure that the melting point of the ionic liquid is controllable according to the purpose of use, such as a significant decrease or increase in the melting point of the ionic liquid. By using the electrolyte containing the porous coordination polymer-ionic liquid composite, it is ensured to achieve, for example, electrochemical devices, such as batteries and electrical double-layer capacitors.

BRIEF DESCRIPTION OF THE DRAWINGS

FIG. 1(A) shows the porous coordination polymer-ionic liquid composite, and FIG. 1(B) shows the porous coordination polymer (insulating structure) and the ionic liquid before subjected to compositing;

FIG. 3(A) shows a molded body (structure) made of a plurality of particles composed of the porous coordination polymer, and FIG. 3(B) shows the porous coordination polymer-ionic liquid composite with which the ionic liquid is filled and retained in the structure of FIG. 3(A);

DETAILED DESCRIPTION OF THE PREFERRED EMBODIMENTS

A porous coordination polymer-ionic liquid composite according to the present invention (hereinafter generally referred to simply as "composite") is described with reference to FIG. 1. FIG. 1 is a schematic diagram showing an embodiment of the porous coordination polymer-ionic liquid composite according to the present invention.

Figure 1A:
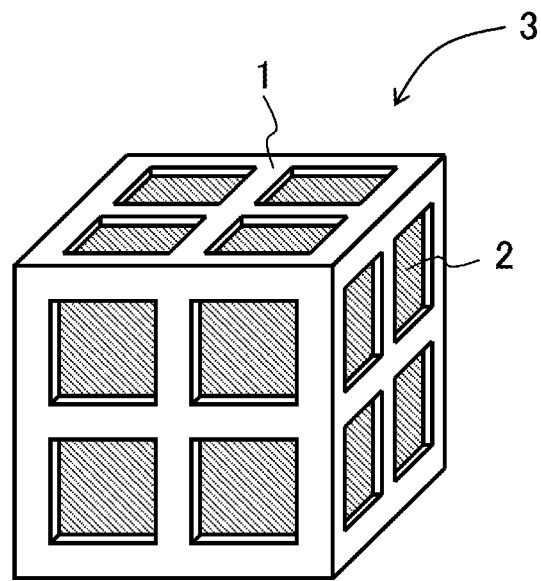
FIGS. 1(A) and 1(B) are schematic diagrams showing an embodiment of a porous coordination polymer-ionic liquid composite according to the present invention, specifically.
Figure 1B:
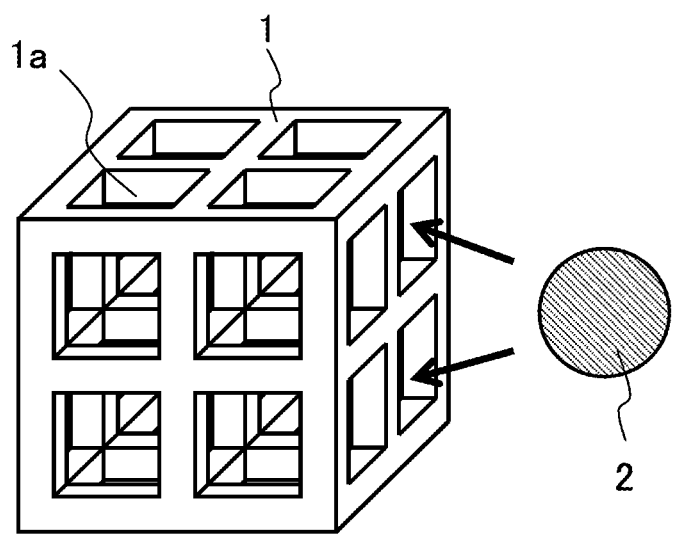

As shown in FIG. 1(A), the composite 3 is made of an insulating structure 1 with pores 1a, and an ionic liquid 2. The ionic liquid 2 is retained inside the pores 1a.

The structure 1 is composed of a porous coordination polymer having a main chain containing a typical metal element. Examples of the porous coordination polymer include an MOF (metal-organic framework) and a PCP (porous coordination polymer). The pores 1a of each of these porous coordination polymers are uniform in diameter and shape, and hence physical properties of the ionic liquid retained inside the pores 1a are uniform. The porous coordination polymer having the main chain containing the typical metal element is used as the porous coordination polymer constituting the structure 1. However, the porous coordination polymer in the present invention is not limited to those having a main chain containing the typical metal element.

The porous coordination polymer includes a large number of the pores 1a in a micropore region, and the pores 1a are uniform in diameter because their diameter is determined based on a crystal structure. Accordingly, the physical properties, such as the melting point of the ionic liquid 2 retained inside the pores 1a, are uniform. Moreover, the pores 1a of the porous coordination polymer are based on a crystal lattice as described above. This ensures that the structure 1 with the pores 1a having the uniform pore diameter is produced with satisfactory reproducibility in the micropore region.

Examples of the porous coordination polymer include the following:

Zn(MeIM)$_2$ (hereinafter referred to as "ZIF-8");
Al(OH)[BDC] (hereinafter referred to as "MIL-53(A1)");
Cr(OH)[BDC] (hereinafter referred to as "MIL-53(Cr)");
Fe(OH) [BDC] (hereinafter referred to as "MIL-53(Fe)");
Zn$_2$ (DOBDC) (hereinafter referred to as "MOF-74 (Zn)");
Mg$_2$ (DOBDC) (hereinafter referred to as "MOF-74 (Mg)");
Al(OH)(1,4-NDC);
Cr$_3$F(H$_2$O)$_2$O(BDC)$_3$ (hereinafter referred to as "MIL-101(Cr)");
Al$_8$(OH)$_{12}${(OH)$_3$(H$_2$O)$_3$} [BTC]$_3$ (hereinafter referred to as "MIL-110(Al)");
Cu$_3$(BTC)$_2$ (hereinafter referred to as "HKUST-1");
UiO-66;
UiO-67; and
UiO-68

The abbreviations used for the above chemical formulas are as follows:
HMeIM: 2-methylimidazole;
H$_2$BDC: 1,4-benzenedicarboxylic acid;
H$_4$DOBDC: 2,5-dihydroxyterephthalic acid;
H$_2$NDC: 1,4-naphthalenedicarboxylic acid;
H$_3$BTC: 1,3,5-benzenetricarboxylic acid;

H₂BPDC: 4,4'-biphenyldicarboxylic acid; and
H₂TPDC: 4,4"-p-terphenyldicarboxylic acid Further, durability against the ionic liquid is needed for the structure 1. In the porous coordination polymer whose main chains are formed by coordination bonds between organic ligands and metal ions, when the metal ion is a Lewis acid and the organic ligand is a Lewis base, the crystal structure of the porous coordination polymer can be maintained even in contact with the ionic liquid 2 by combining an acid and a base that have approximately the same hardness. According to HSAB principle, in general, a strong bond is formed between a hard acid and a hard base, and a strong bond is formed between a soft acid and a soft base. In the porous coordination polymer, the metal ion is the Lewis acid and the organic ligand is the Lewis base, their bond strength controls the resistance of the porous coordination polymer to the ionic liquid.

Examples of hard acids, hard bases, soft acids, soft bases, intermediate acids, and intermediate bases are described, for example, Thomas, G. Medicinal Chemistry: An Introduction, 2nd edition; WiLey: New York, 2007.

For example, 1,4-benzenedicarboxylic acid, 2,5-dihydroxyterephthalic acid, 1,4-naphthalenedicarboxylic acid, and 1,3,5-benzenetricarboxylic acid are hard bases having an $RCOO^-$ structure in molecules. Therefore, porous coordination polymers respectively obtained from these compounds and the metal ion as a hard acid (for example, $Al^{3+}$, $Cr^{3+}$, $Mg^{2+}$, $Fe^{3+}$, and $Zr^{4+}$) have excellent resistance to the ionic liquid. Specific examples of these porous coordination polymers include MIL-53(Al) and Al(OH)(1,4-NDC), whose metal ion is $Al^{3+}$; MIL-53(Cr) and MIL-101 (Cr), whose metal ion is $Cr^{3+}$; MOF-74(Mg), whose metal ion is $Mg^{2+}$; MIL-53(Fe) whose metal ion is $Fe^{3+}$; and UiO-66, a UiO-67, and UiO-68, whose metal ion is $Zr^{4+}$.

On the other hand, porous coordination polymers obtained from the above compound that is a hard base and a metal ion that is an acid having intermediate hardness (such as $Fe^{2+}$, $Co^{2+}$, $Zn^{2+}$, and $Cu^{2+}$) have slightly lower resistance against the ionic liquid. Specific examples of the porous coordination polymer include MOF-74(Zn) whose metal ion is $Zn^{2+}$, and HKUST-1 whose metal ion is $Cu^{2+}$.

For example, imidazole is a base having intermediate hardness. Therefore, a porous coordination polymer obtained from an imidazole-based ligand and a metal ion that is an acid having intermediate hardness has excellent resistance to the ionic liquid. This corresponds to, for example, all ZIF (zeolitic imidazolate frameworks) based porous coordination polymers respectively composed of $Fe^{2+}$, $Co^{2+}$, or $Zn^{2+}$, and ZIF-8 is representative.

The metal ion of the porous coordination polymer preferably does not have a coordinatively unsaturated site. The metal ion having the coordinatively unsaturated site makes it easier for an anion of the ionic liquid to approach the metal ion of the porous coordination polymer. Consequently, the bond between the metal ion and the organic ligand is weakened, resulting in breakage of the porous coordination polymer. That is, the MIL-53(Al), Al(OH)(1,4-NDC), MIL-53(Cr), MIL-53(Fe), and ZIF based ones (such as ZIF-8), each having no coordinatively unsaturated site, have excellent resistance to the ionic liquid.

Conversely, the MIL-101(Cr), MOF-74(Mg), MOF-74 (Zn), HKUST-1, UiO-66, UiO-67, and UiO-68, each having the coordinatively unsaturated site, have slightly lower resistance to the ionic liquid.

Whether or not the porous coordination polymer has the coordinatively unsaturated site can be determined by the crystal structure of the porous coordination polymer. The crystal structure of the porous coordination polymer can be examined by X-ray diffraction, infrared spectroscopy, or the like. The number of the coordinatively unsaturated sites is determined by the kind of the porous coordination polymer. For example, in the MIL-101(Cr), MOF-74(Mg), MOF-74 (Zn), HKUST-1, UiO-66, UiO-67, and UiO-68, the number of the coordinatively unsaturated sites and the number of metal ions are equal to each other.

In the MIL-101(Cr), MOF-74(Mg), MOF-74(Zn), and HKUST-1, each metal ion forms a coordinate bond with six oxygen atoms. Among the six oxygen atoms, five of oxygen atoms are the oxygen atoms of the organic ligand and the remaining one is the oxygen atom of the molecules of a solvent (such as DMF). For example, by heating this porous coordination polymer while performing evacuation, the solvent molecules coordinated to the metal ions can be removed. Consequently, one of six coordination sites becomes empty so as to form a coordinatively unsaturated site.

In the UiO-66, UiO-67, and UiO-68, each $Zr^{4+}$ forms a coordinate bond with eight oxygen atoms. Among the eight oxygen atoms, four of oxygen atoms are the oxygen atoms of the organic ligand, the two oxygen atoms are those based on $O^{2-}$, and the remaining two oxygen atoms are those based on $OH^-$. For example, by heating this porous coordination polymer while performing evacuation, the oxygen atom coordinated to each $Zr^{4+}$ is changed to four oxygen atoms of the organic ligand and three oxygen atoms based on $O^{2-}$, thereby forming a coordinatively unsaturated site.

In most porous coordination polymers, all of the coordination sites of metal ions are occupied by the oxygen atoms or nitrogen atoms of organic ligands, and hence no coordinatively unsaturated site exists. In the composite made of a porous coordination polymer and an ionic liquid, it is conceivable that the anion of the ionic liquid is easily coordinated to the coordinatively unsaturated site of the metal ion so as to eliminate the coordinatively unsaturated site. The present description defines that "the porous coordination polymer has a coordinatively unsaturated site" when the coordinatively unsaturated site can be formed by removing the ionic liquid inside the pores in the porous coordination polymer, followed by heating while performing evacuation.

Whether or not the coordinatively unsaturated site is formed by removing the ionic liquid inside the pores, followed by heating while performing evacuation can be confirmed by infrared spectroscopy, elementary analysis, or the like.

The metal ion of the porous coordination polymer is preferably a typical metal element. The term "typical metal element" denotes metal elements not in a transition metal series, for example, metal elements that belong to Group 1, Group 2, and Groups 12 to 18 in the periodic table. That is, each of the typical metal elements is one in which electrons are sequentially arranged in an s-orbital or p-orbital in the outermost shell and have therein characteristics unique to the metal. The valences of the typical metal elements are difficult to change, and hence the porous coordination polymer having the main chain containing these typical metal elements is capable of maintaining the crystal structure of the porous coordination polymer even in contact with the ionic liquid 2. On the other hand, when the metal element contained in the main chain is a transition metal element, the valence of the transition metal element may be changed upon contact with the ionic liquid 2, thus leading to breakage of the crystal structure of the porous coordination polymer. From this viewpoint, preferred porous coordination polymers are MIL-53(Al), Al(OH)(1,4-NDC), ZIF-8, and ZIF based ones, whose metal ion is $Zn^{2+}$.

The porous coordination polymer is synthesized by using a metal compound and an organic compound as raw materials, and by allowing these to be reacted with each other in a reaction solvent. The metal compound is a metal ion supply source, and examples thereof include metal nitrate. The organic compound is an organic ligand supply source, and examples thereof include 1,4-benzenedicarboxylic acid (trivial name: terephthalic acid), 1,4-naphthalenedicarboxylic acid, and 2-methylimidazole.

The reaction solvent is not particularly limited as long as being capable of dissolving the metal compound and the organic compound. Examples thereof include water, N,N-dimethylformamide (DMF), and methanol. Alternatively, the ionic liquid may be used as the reaction solvent. The metal compound and the organic compound are blended into the reaction solvent and stirred at room temperature, or held in a pressure vessel at 100 to 200° C. for 5 to 100 hours. Consequently, the metal ions and the organic ligand are reacted with each other to form a coordination bond, thus producing a porous coordination polymer. After the reaction, particles of the porous coordination polymer precipitated in the reaction solvent are recovered by means of, for example, filtration or centrifugation.

Alternatively, a film-shaped porous coordination polymer may be produced by applying a solution containing the metal compound and the organic compound to a base material so as to cause a reaction at room temperature or high temperature.

The reaction may be conducted in an inert gas atmosphere in order to prevent transformation of the raw materials. After the reaction, the reaction solvent is removed by cleaning and drying, the powder or film of the porous coordination polymer is obtained.

Whether or not the porous coordination polymer is formed can be confirmed by performing powder X-ray diffraction (XRD) measurement of the obtained porous coordination polymer, and by analyzing an obtained diffraction pattern.

The structure 1 composed of the above porous coordination polymer is made into an insulating material that has insulation property, namely, does not have electron conductivity, and the ionic liquid 2 is retained inside the pores 1a of the structure 1. Thus, the composite 3 has ionic conductivity but does not have electron conductivity so as to be usable as the electrolyte for the battery or the electrical double-layer capacitor.

By allowing the pores 1a to have a micropore region size, the melting point of the ionic liquid 2 can be remarkably decreased than the melting point of the ionic liquid 2 when filling the ionic liquid 2 with mesopores of porous glass or the like (refer to the patent document 1), or than the melting point of the ionic liquid 2 estimated when filling the ionic liquid 2 with pores having a diameter corresponding to that of micropores.

This is due to the fact that when the size of the pores 1a retaining the ionic liquid 2 falls within the micropore region, the number of ion pairs capable of existing inside the pores 1a is reduced to an order of 10 pairs or less in a diameter direction of the pores 1a. When the ionic liquid is frozen, cations and anions constituting the ionic liquid 2 are required to be regularly arranged by hydrogen bond. However, when the size of the pores 1a falls within the micropore region, the number of ions existing inside the pores 1a is extremely reduced. Therefore, it is not easy for the ions to find other ions of different polarity, thus making it difficult to ensure formation of the ion pairs and freezing of the ionic liquid. This consequently may lead to a considerable decrease in the melting point of the ionic liquid 2.

Depending on molecules existing inside pores, the porous coordination polymer may have characteristics that the size of the pores is enlarged or reduced. When the ionic liquid 2 is filled with the pores 1a of the structure 1 composed of the above porous coordination polymer, the pores 1a are deformed into an optimum size so as to facilitate regular arrangement of cations and anions. Consequently, it is conceivable that the ionic liquid 2 is brought into a stable solid state so as to raise the melting point.

Examples of the porous coordination polymer having the characteristics that the pore size is enlarged or reduced include MIL-53(Al).

In the field of catalysts in International Union of Pure and Applied Chemistry (IUPAC), micropores are defined as pores having a diameter of 2 nm or less. Pores having a diameter of 2 to 50 nm are defined as mesopores, and pores having a diameter of 50 nm or more are defined as macropores. The ionic liquid generally denotes salts having a melting point of 100° C. or less. However, in the present description, salts whose melting point becomes 100° C. or less by being retained inside the pores are also referred to as "ionic liquid."

The diameter of the pores 1a is preferably 1.5 nm or less, thereby more significantly decreasing the melting point of the ionic liquid 2. Further, the diameter of the pores 1a is preferably 0.3 nm or more. This is because it is difficult to allow the ions constituting the ionic liquid to exist in the pores 1a of less than 0.3 nm. The diameter of the pores 1a is obtainable from measurement by gas absorption method, or from a crystal structure obtained by X-ray structure analysis. When measured by gas absorption method, the measurement needs to be made after the ionic liquid and adsorbate inside the pores 1a are removed by cleaning the composite 3 with water, or the like.

In the present description, the diameter of the pores 1a is a mean value of a measured pore diameter distribution, or when the structure 1 has the pores 1a based on the crystal structure shown in FIG. 1, the diameter of the pores 1a is a diameter of a sphere that internally contacts with an inner wall of the pore 1a. The pores 1a fall within the micropore region when the diameter of the pores 1a is 2 nm or less.

The pores 1a may have any one of one-, two-, and three-dimensional shapes, and the three-dimensional shape is particularly preferred. The pores 1a having the three-dimensional shape allow ion conduction pathways to be most surely configured. This is because the ion conduction pathways are formed isotropically and their interconnection is facilitated so as to enhance ionic conductivity.

The shape of the structure 1 is not particularly limited, and it may have any one of particle shape, wire (line) shape, rod (bar) shape, sheet (plate) shape, film shape, and bulk shape. A shorter moving distance that the ionic liquid 2 reaches the center of the structure 1 through the pores 1a further ensures that the ionic liquid 2 is filled with the pores 1a in the structure 1. Specifically, the distance from the outer periphery of the structure 1 to the center thereof is preferably 10 μm or less. Accordingly, the shape of the structure 1 is more preferably the particle shape, line shape, or bar shape having a diameter of 20 μm or less, or the film shape having a thickness of 20 μm or less.

Examples of the ionic liquid 2 include imidazolium salt, pyrrolidinium salt, pyridinium salt, quaternary ammonium salt, quaternary phosphonium salt, and sulfonium salt. Alternatively, alkali metal salts, such as lithium salt and sodium salt, may be used. Among these, imidazolium salt having a relatively small cation size and a low melting point is particularly preferably used. Examples of the anions include halogens such as $Cl^-$ and $Br^-$, $BF_4^-$, $PF_6^-$, $CF_3SO_3^-$, $FSO_2NSO_2F^-$ (FSI), $CF_3SO_2NSO_2CF_3^-$ (TFSI), $C_2F_5SO_2NSO_2C_2F_5^-$ (BETI), $ClO_4^-$, $SO_3C_6H_4CH_3^-$ (p-toluenesulfonate), and $SCN^-$.

These ionic liquids 2 may be used alone, or two or more kinds of these may be used together. As a battery electrolyte, ones obtained by dissolving lithium salt or sodium salt are particularly preferably used.

The composite 3 is obtained by filling the above ionic liquid 2 with the pores 1a of the structure 1. On this occasion, the porous coordination polymer having relatively low resistance to the ionic liquid as described above is high in degree of dissociation, and hence may be destroyed by use of the ionic liquid 2 that facilitates individual motion of cations and anions, such as, 1-ethyl-3-methylimidazolium bis(trifluoromethanesulfonyl)imide (EMI-TFSI). When the composite 3 is formed using this porous coordination polymer, there is need to use the ionic liquid 2 that is low in degree of dissociation. For example, it is preferable to use one that contains, as cation, pyrrolidinium ion, piperidinium ion, pyridinium ion, aliphatic quaternary ammonium ion, aliphatic quaternary phosphonium ion, or aliphatic tertiary sulfonium ion. Alternatively, it is preferable to use one that contains, as an anion, halogens such as $Cl^-$ or $Br^-$, $BF_4^-$, $PF_6^-$, $CF_3SO_3^-$, $ClO_4^-$, $SO_3C_6H_4CH_3^-$ (p-toluenesulfonate), or $SCN^-$.

It is preferable to remove molecules and ions attached to the inside of the pores 1a before filling the ionic liquid 2 with the pores 1a of the structure 1. When the attached molecules and ions remain inside the pores 1a, the pores 1a may be narrowed or completely closed by the molecules and the ions, thus making it difficult to fill the ionic liquid 2 with the pores 1a. Moreover, there is concern that the physical properties of the ionic liquid 2 are changed to make it difficult to control the melting point due to impurities contamination.

As a method for removing the molecules and ions attached to the inside of the pores 1a, there is, for example, a method in which the structure 1 is washed with a cleaning liquid so as to wash the molecules and ions attached to the inside of the pores 1a, and a method in which high temperature heat treatment or vacuum heat treatment is performed to isolate the attached molecules and ions. As the cleaning liquid, water, methanol, ethanol, or dimethylformamide is preferably used. After the cleaning, the cleaning liquid is preferably removed by subjecting the structure 1 to heat treatment, vacuum treatment, or vacuum heat treatment in order to prevent the cleaning liquid from remaining inside the pores 1a.

As a method of filling the ionic liquid 2 with the pores 1a, when the structure 1 having the pores 1a has the particle shape, there is, for example, a method in which a mixture of the particles of the structure 1 and the ionic liquid 2 are allowed to stand still. The mixture may be left to stand, for example, under a temperature environment of approximately 100 to 200° C. in order to facilitate diffusion of the ionic liquid 2 into the structure 1. Basically, a higher temperature further facilitates the diffusion of the ionic liquid 2 into the pores 1a. However, there is concern that a too high temperature facilitates the reaction between the structure 1 and the ionic liquid 2. Therefore, the standstill temperature is properly adjusted by a combination of the structure 1 and the ionic liquid 2. In order to prevent moisture from being attached to the inside of the pores 1a and the ionic liquid 2, the process of filling the ionic liquid 2 with the structure 1 is preferably performed, for example, in a vacuum and in a dry atmosphere of a dew point of −20° C. or less. Moreover, in order to prevent a chemical reaction, such as oxidation and reduction, of the structure 1 and the ionic liquid 2, the process of filling is more preferably performed in a vacuum, or under an inert atmosphere of nitrogen, argon, or the like.

When the structure 1 has the film shape, an ion conductive film containing the composite 3 is obtained, for example, with a method of applying the ionic liquid to the surface of the film-shaped structure 1 formed on a base material, or a method of immersing the film-shaped structure 1, together with the base material, in the ionic liquid so as to fill the ionic liquid 2 with the film-shaped structure 1. Excess ionic liquid needs to be removed by cleaning the structure 1 with a solvent, such as water or methanol, or by pressing a filter paper against the ion conductive film so as to absorb the excess ionic liquid.

The ion conductive film containing the composite 3 can also be produced in the following manner. That is, a slurry obtained by dispersing the particles of the structure 1 in the ionic liquid 2 is made into a film shape or sheet shape by a well-known application method or tape molding method. Similarly to the case of the film-shaped structure 1, excess ionic liquid needs to be removed by cleaning the ion conductive film with a solvent, such as water or methanol, or by pressing a filter paper against the ion conductive film so as to absorb the excess ionic liquid.

The structure 1 with the pores 1a and the ionic liquid 2 are preferably mixed together at a mixing ratio so that the full capacity of the pores 1a included in the structure 1 and the volume of the ionic liquid 2 are equal to each other. Both may be mixed together at such a ratio that the ionic liquid 2 is too little or too much. However, even when the ionic liquid 2 is too little, the volume of the ionic liquid 2 with respect to the full capacity of the pores 1a is preferably 20% or more. In the case of being less than 20%, there is a possibility that the ionic liquid pathways are discontinued and ion conduction is cut off. When the ionic liquid 2 is too much, the volume of the ionic liquid 2 to the full capacity of the pores 1a is preferably less than 200% (two times). Particularly, in the case of aiming at decreasing the melting point, when exceeding 200% (two times), excess ionic liquid may cover the outer periphery of the structure 1, and the ionic conductivity of the composite 3 is to be limited by the ionic liquid 2 existing outside the pores 1a. In this case, particularly, in a temperature range in which the excess ionic liquid 2 existing outside the pores 1a is brought into a solid state, even though the ionic liquid inside the pores 1a is in a liquid state, the ionic conductivity of the composite 3 is to be limited by the ionic liquid in the solid state. This makes it difficult to obtain the effect of decreasing the melting point of the ionic liquid 2 by retaining the ionic liquid 2 inside the pores 1a in the micropore region.

In order to confirm that the ionic liquid 2 is retained inside the pores 1a of the structure 1, there is a need to confirm whether or not the case of the ionic liquid 2 alone and the case of the composite 3 differ in temperature at which a peak indicating exotherm or endotherm, by performing, for example, differential scanning calorimetry (DSC) of the ionic liquid 2 alone and that of the composite 3.

When the ionic liquid 2 exists excessively with respect to the capacity of the pores 1a of the structure 1, this sometimes indicates the same melting point as the case of the ionic liquid 2 alone. In this case, it is possible to determine whether or not the ionic liquid 2 exists inside the pores 1a of the structure 1 by evaluating the composite 3 with solid-state nuclear magnetic resonance (NMR) analysis method or AC impedance method while changing a measurement temperature, and by confirming the presence or absence of phase transition behavior at a lower temperature than the melting point in the case of the ionic liquid 2 alone.

Figure 2:
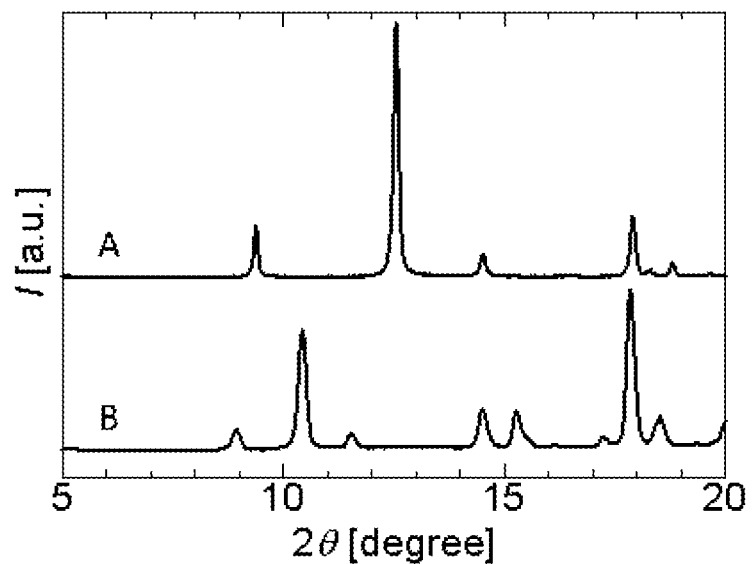
FIG. 2 is a chart showing X-ray diffraction (XRD) measurement results, in which "A" is the chart indicating the result of powder of a MIL-53(A1) alone, and "B" is the chart indicating the result of composite powder of the MIL-53 (A1) and an EMI-TFSI.

When the crystal structure of the structure 1 is changed depending on the kind of molecules stored inside the pores 1a, it is also possible to confirm whether or not the ionic liquid 2 is retained inside the pores 1a, from an X-ray diffraction (XRD) pattern analysis of the composite 3. For example, when MIL-53(Al) is used as the porous coordination polymer, the case where only moisture is attached to the inside of the pores 1a when used the MIL-53(Al) alone, the structure 1 has a monoclinic structure as indicated by "A" in FIG. 2. The case where EMI-TFSI as the ionic liquid 2 exists inside the pores 1a of MIL-53(Al), the structure 1 has an orthorhombic structure as indicated by "B" in FIG. 2. Therefore, the kind of material stored inside the pores 1a can be determined from the X-ray diffraction (XRD) pattern analysis.

The kind and composition of the porous coordination polymer and the ionic liquid to be used may be determined by elemental analysis, X-ray diffraction (XRD) measurement, nuclear magnetic resonance (NMR) analysis, or the like.

Figure 3A:
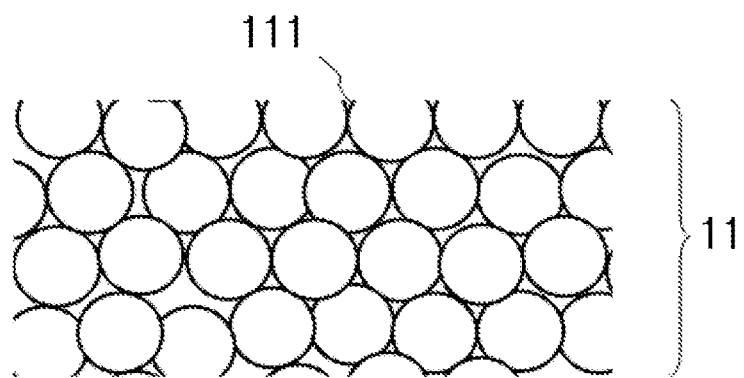
FIGS. 3(A) and 3(B) are cross-sectional views showing another embodiment of the porous coordination polymer-ionic liquid composite according to the present invention, specifically
Figure 3B:
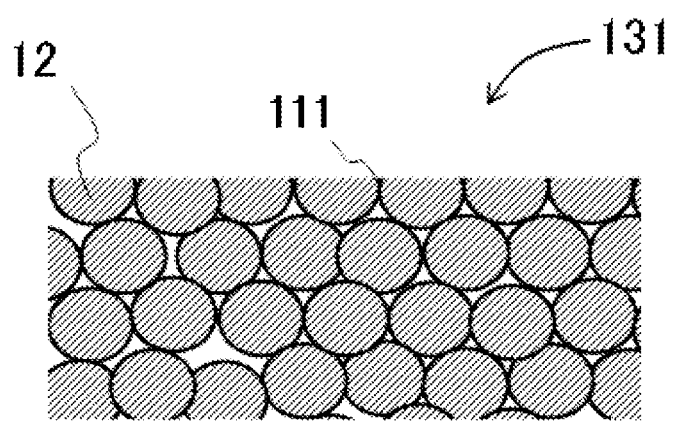

Another embodiment of the porous coordination polymer-ionic liquid composite according to the present invention is described with reference to FIGS. 3 and 4. FIG. 3(A) is a cross-sectional view of a structure 11 used in the present embodiment. FIG. 3(B) shows a composite 131 obtained by filling an ionic liquid 12 with pores of the structure 11.

The structure 11 is a molded body obtained by subjecting a plurality of particles 111 composed of a porous coordination polymer to compression molding. When the composite 131 obtained using the structure 11 is used as an electrolyte for a battery or an electrical double-layer capacitor, the structure 11 has a dense structure, thus making it easier for ion conduction pathways between the particles to be connected to each other. Hence, the composite 131 is a satisfactory ion conductor.

In the case of using the structure 11 obtained by subjecting a plurality of the particles 111 composed of the porous coordination polymer to compression molding, a plurality of voids are respectively formed between the particles 111 of the porous coordination polymer. An ion conductive material 5 preferably exists at least a part of a plurality of the voids as shown in a composite 132 in FIG. 4. The ion conductive material 5 existing in the voids ensures configuration of the ion conduction pathways.

Examples of the ion conductive material 5 include water, organic electrolyte solution, ionic liquid, ion conductive polymer. Among these, the ionic liquid is preferably used in terms of high ion conductivity and low vapor pressure. Unlike a normal organic electrolyte solution, the ionic liquid of low vapor pressure is not to be lost by evaporation. Particularly, it is preferable to use the same material (ionic liquid) as the ionic liquid 12 retained inside the pores of the structure 11 in terms of smoother ion conduction inside and outside the particles of the composite 132.

A solid ion conductive material may be used as the ion conductive material 5. Examples of the solid ion conductive material include ion conductive polymer particles, and inorganic ion conductive material particles. Although the solid ion conductive material generally has low ion conductivity, the composite 132 serves mainly as the ion conduction pathways, and the ion conductive material 5 is positioned secondarily. Therefore, the ion conductive material has a small influence even through having the low ion conductivity. In the case of using the solid ion conductive material, it is particularly preferable to fill the ion conductive polymer with the voids in order to make it easier to retain the shape of the structure 11.

The structure 11 is obtained by subjecting a plurality of the particles 111 composed of the porous coordination polymer to compression molding with a well-known method, such as uniaxial pressing, isostatic pressing, roller rolling, or extrusion molding. Alternatively, the structure 11 is obtained by molding a slurry obtained by dispersing a plurality of the particles 111 composed of the porous coordination polymer in a solvent, with a well-known sheet molding method, such as tape casting, slip casting, or spin coating, followed by drying.

The ionic liquid 12 is filled with the pores of the structure 11 thus obtained. The method of filling is as described above. In the case of using the ion conductive material 5, the ion conductive material 5 is usually filled with the voids between the particles 111 after filling the ionic liquid 12. For example, the ion conductive material 5 may be allowed to exist between the particles 111 by mixing the particles 111 of the porous coordination polymer and the solid (powder) ion conductive material 5, or by using the ion conductive material 5 in a liquid state as a solvent.

Figure 5:
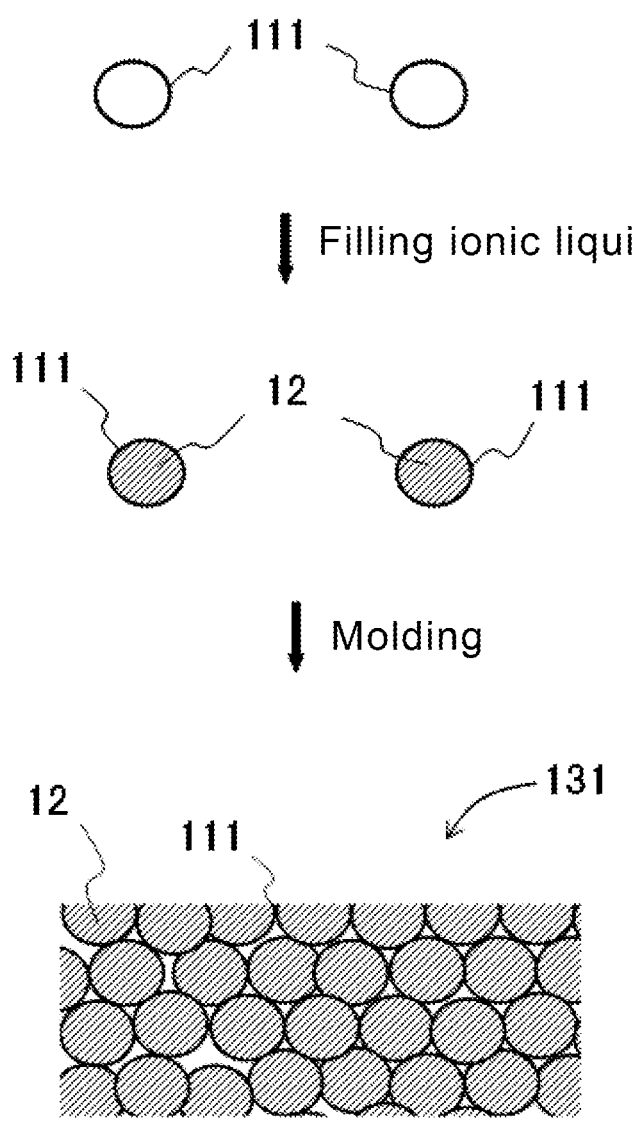
FIG. 5 is a schematic diagram showing that an ionic liquid is filled with particles of the porous coordination polymer so as to form particles after filling.

As shown in FIG. 5, after filling the ionic liquid 12 with the pores of the particles 111 of the porous coordination polymer, the particles obtained after the filling may be molded into a desired shape. Also in the composite 131 shown in FIG. 5, of course, the ion conductive material 5 may be allowed to exist in the voids between the particles 111.

Figure 4:
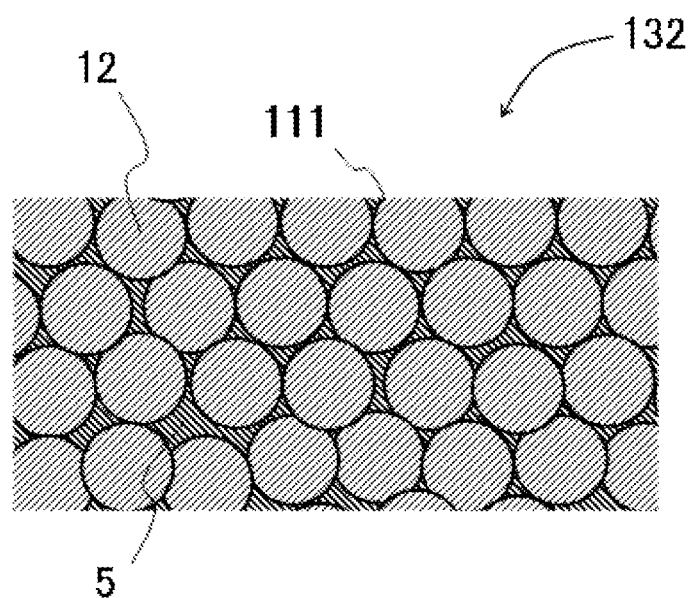
FIG. 4 is a cross-sectional view showing the porous coordination polymer-ionic liquid composite in which ionic liquid is filled with the structure shown in FIG. 3(A) and an ion conductive material is allowed to exist in voids respectively formed between particles constituting the structure.

FIGS. 3 to 5 illustrate the structure 11 in which a plurality of the particles 111 composed of the porous coordination polymer are arranged irregularly. Alternatively, the particles 111 may be arranged regularly. The shape of the structure 11 (the composites 131 and 132) is not particularly limited but may have any desired shape, such as spherical shape, columnar shape (cylindrical shape and prism shape), cone shape (circular cone shape and pyramid shape), wire (line) shape, rod (bar) shape, sheet (plate) shape, and film shape.

Moreover, the composites 131 and 132 may contain additives, such as binder, in such amounts as not to inhibit the effect of the present invention.

EXAMPLES

The present invention is specifically described by illustrating examples and comparative examples, without being limited to these examples.

As an insulating structure with pores (hereinafter generally referred to simply as "structure"), a commercially available ZIF-8, and Al(OH)(1,4-NDC) powder and MOF-74(Zn) powder, both of which were synthesized with the following method, were used. Each of these has pores in a micropore region having a diameter of 2 nm or less as presented in Table 1.

Synthesis of Al(OH)(1,4-NDC)

$H_2NDC$ was used as an organic ligand supply source, $Al(NO_3)_3 \cdot 9H_2O$ was used as a metal ion supply source, and ion-exchanged water was used as a reaction solvent. To 10 mL of the ion-exchanged water, 0.5 mmol of $H_2NDC$ and 1.0 mmol of $Al(NO_3)_3 \cdot 9H_2O$ were added and stirred. Then, the resultant mixture was sealed in a pressure vessel and held at 180° C. for 18 hours to obtain Al(OH)(1,4-NDC) particles. Subsequently, the Al(OH)(1,4-NDC) particles were separated by suction filtration. This was then subjected to cleaning and suction filtration with the ion-exchanged water, followed by drying at room temperature for 1 hour, resulting in Al(OH)(1,4-NDC) powder.

Synthesis of MOF-74(Zn)

$H_4DOBDC$ was used as an organic ligand supply source, $Zn(NO_3)_2.6H_2O$ was used as a metal ion supply source, and a mixed solvent of DMF and 2-propanol and water was used as a reaction solvent. To a mixed solvent of 2 mL of DMF, 0.1 mL of 2-propanol, and 0.1 mL of ion-exchanged water, 0.096 mmol of $H_4DOBDC$ and 0.20 mmol of $Zn(NO_3)_2.6H_2O$ were added and stirred. Then, the resultant mixture was sealed in a pressure vessel and held at 105° C. for 20 hours to obtain MOF-74(Zn) particles. Subsequently, the MOF-74(Zn) particles were separated by suction filtration. This was then sequentially subjected to cleaning and suction filtration with DMF and ethanol, followed by drying at room temperature for 1 hour, resulting in MOF-74(Zn) powder.

Each of the resultant synthesized powders was subjected to X-ray diffraction (XRD) measurement so as to confirm the crystal structure of a porous coordination polymer. Consequently, the formation of the porous coordination polymer was confirmed.

ZIF-8 powder was subjected to cleaning with a suitable solvent, followed by drying, so as to remove molecules attached to the inside of the pores.

Each of the resultant powders of these structures was subjected to vacuum drying process (at 150° C. for 15 hours) so as to remove moisture inside the pores. A particle size of the powder of each of these structures was determined by a transmission electron microscope (TEM) observation. There was used the powder having a mean particle size of 0.1 μm based on image analysis.

were also subjected to vacuum drying process (at 150° C. for 15 hours) so as to remove moisture.

Subsequently, the ionic liquids were filled with the pores of the structure after subjected to the vacuum drying. The powder of the structure and the ionic liquids were mixed together, and heat treatment was conducted in a dry Ar atmosphere as required, thereby preparing a composite. A mass ratio of the ionic liquid when the powder of the structure is taken as 1, and heat treatment conditions are presented in Table 1.

The resultant composites were respectively subjected to X-ray diffraction (XRD) measurement, and were evaluated in the following manner. That is, symbol "○" indicates one in which a diffraction peak of a porous coordination polymer was confirmed, and symbol "x" indicates one in which no diffraction peak was confirmed. The results are presented in Table 1.

Differential scanning calorimetry (DSC) measurements of the resultant composites were conducted in a temperature range of −150 to 100° C. The temperature was increased or decreased at a rate of 5° C./min in a temperature range of −150 to −100° C. and a rate of 1° C./min in a temperature range of −100 to 100° C. Melting points observed in the process of increasing temperature are presented in Table 1. The case where neither an exothermic peak nor an endothermic peak was observed in the measurement temperature range was described as one whose melting point was lower than −150° C. There was a sample in which the volume of the ionic liquid with respect to the capacity of the pores of the structure is apparently excess (the sample in which the mass ratio of the ionic liquid is 10). This sample exhibited a behavior similar to that of the ionic liquid alone, and therefore no differential scanning calorimetry (DSC) measurement was conducted.

TABLE 1

| Sample No. | Structure | | | Ionic liquid | | Heat treatment conditions | | XRD | DSC Melting point (° C.) |
|---|---|---|---|---|---|---|---|---|---|
| | Type | Pore diameter (nm) | Metal ion | Type | Mass ratio | Temperature (° C.) | Time (Hours) | | |
| 1 | ZIF-8 | 1.2 | Zn | EMI-TFSI | 10 | 25 | 2 | ○ | — |
| 2 | ZIF-8 | 1.2 | Zn | EMI-TFSI | 10 | 200 | 2 | ○ | — |
| 3 | ZIF-8 | 1.2 | Zn | EMI-TFSI | 1 | 200 | 15 | ○ | −25 |
| 4 | ZIF-8 | 1.2 | Zn | EMI-TFSI | 0.625 | 200 | 15 | ○ | <−150 |
| 5 | ZIF-8 | 1.2 | Zn | EMI-TFSI | 0.25 | 200 | 15 | ○ | <−150 |
| 6 | ZIF-8 | 1.2 | Zn | EMI-Cl | 10 | 100 | 2 | ○ | — |
| 7 | ZIF-8 | 1.2 | Zn | EMI-Cl | 0.8 | 100 | 15 | ○ | 78 |
| 8 | ZIF-8 | 1.2 | Zn | EMI-Cl | 0.2 | 100 | 15 | ○ | <−150 |
| 9 | Al(OH)(1,4-NDC) | 0.8 | Al | EMI-TFSI | 10 | 25 | 2 | ○ | — |
| 10 | Al(OH)(1,4-NDC) | 0.8 | Al | EMI-TFSI | 10 | 200 | 2 | ○ | — |
| 11 | Al(OH)(1,4-NDC) | 0.8 | Al | EMI-TFSI | 1 | 200 | 15 | ○ | −18 |
| 12 | Al(OH)(1,4-NDC) | 0.8 | Al | EMI-TFSI | 0.25 | 200 | 15 | ○ | <−150 |
| 13 | MOF-74(Zn) | 1.1 | Zn | EMI-TFSI | 10 | 25 | 2 | ○ | — |
| 14* | HKUST-1 | 0.5, 1.5 | Cu | EMI-TFSI | 10 | 25 | 2 | x | — |
| 15* | MIL-101(Cr) | 2.9, 3.4 | Cr | EMI-TFSI | 10 | 25 | 2 | x | — |
| 16 | MIL-53(Al) | 1.0 | Al | EMI-TFSI | 10 | 25 | 2 | ○ | — |
| 17 | MIL-53(Al) | 1.0 | Al | EMI-TFSI | 10 | 200 | 2 | ○ | — |
| 18 | MIL-53(Al) | 1.0 | Al | EMI-TFSI | 1 | 200 | 15 | ○ | −20.56 |
| 19 | MIL-53(Al) | 1.0 | Al | EMI-TFSI | 0.25 | 200 | 15 | ○ | 20.41 |
| 20 | MIL-53(Al) | 1.0 | Al | EMI-Cl | 10 | 200 | 2 | ○ | — |

Samples indicated with "*" are outside the scope of the present invention (corresponding to Comparative Examples). HKUST-1 and MIL-101(Cr) used in Samples Nos. 14 and 15 have two types of pores different in size.

Figure 6:
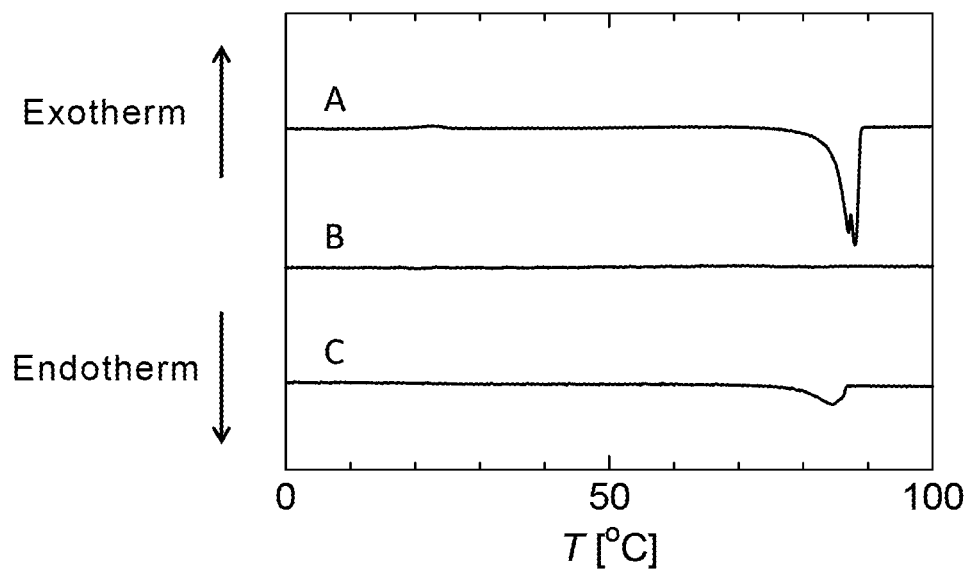
FIG. 6 is a chart showing differential scanning calorimetry (DSC) results, in which "A" is the chart showing the result about an EMI-Cl alone, "B" is the chart showing the result of a composite of Sample No. 8 in the Example, and "C" is the chart showing the result about a composite of Sample No. 7 in the Example.

As an ionic liquid, two kinds of ionic liquids were used, namely, 1-ethyl-3-methylimidazolium bis(trifluoromethanesulfonyl)imide (hereinafter generally referred to as "EMI-TFSI"), and 1-ethyl-3-methylimidazolium chloride (hereinafter generally referred to as "EMI-Cl"). These ion liquids FIG. 6 shows the measurement results in the process of increasing temperature from 0 to 100° C. in the differential scanning calorimetry (DSC) of EMI-Cl alone and Sample Nos. 7 and 8. In FIG. 6, "A" indicates the measurement result of the EMI-Cl alone, "B" indicates that of the composite (Sample No. 8) in which ZIF-8:EMI-Cl=5:1 (mass ratio), and "C" indicates the measurement result of the composite (Sample No. 7) in which ZIF-8:EMI-Cl=5:4 (mass ratio).

In the DSC pattern of "A", the endothermic peak appears at approximately 84° C., which indicates that the melting point of the EMI-Cl alone is approximately 84° C. On the other hand, in the DSC pattern of "B", no peak corresponding to melting or freezing appears in the range of −150 to 100° C. Therefore, it can be seen that the composite of Sample No. 8 has neither melting point nor freezing point in this temperature range. One possible reason for this is that the EMI-Cl alone having the melting point of 84° C. is absent, and all the EMI-Cl exist inside the pores of the ZIF-8, and hence the melting point is lower than −150° C., namely, the melting point is decreased by 234° C. or more. According to the non-patent document 1, when the ionic liquid is filled in ZIF-8 with pores having a diameter of, for example, 1.2 nm, it is expected that the melting point is to be lowered by approximately 140 to 187° C. However, the present embodiment showed the melting point lower than the expected value by 50° C. or more.

Provided that the melting point of EMI-Cl existing in the pores of ZIF-8 is higher than 100° C., when the ZIF-8 and the EMI-Cl are mixed together and heated at 100° C., the EMI-Cl freezes at the moment it enters the ZIF-8. Therefore, it is estimated that subsequent ingress of the EMI-Cl is inhibited while the single EMI-Cl remains and the melting point thereof is observed.

From the DSC pattern of "C", it can be seen that the composite of Sample No. 7 has a melting point of 78° C., which is almost unchanged from the case of the EMI-Cl alone. One possible reason for this is that the melting point of the EMI-Cl existing in the pores of the ZIF-8 is lower than −150° C., which is therefore unobservable similarly to that in "B", and the melting of excess EMI-Cl failing to enter the pores of the ZIF-8 is observed as 78° C.

Similarly to Sample No. 8, in Sample Nos. 4, 5 and 12, no peak corresponding to melting point or freezing point appears in the range of −150 to 100° C. One possible reason for this is that all the ionic liquid exists in the pores of the structure, thus having a melting point lower than −150° C. Similarly to Sample No. 7, the melting points observed in Sample Nos. 3 and 11 are those of excess ionic liquid failing to enter the pores of the structure. The melting point of the ionic liquid (EMI-TFSI) alone used in Sample Nos. 1 to 5 and 9 to 13 is −17° C.

Thus, it was confirmed that in each of Sample Nos. 1 to 13, the composite was formed and the melting point of the ionic liquid was decreased than the case of the ionic liquid alone.

Further, Sample Nos. 18 and 19 were subjected to DSC measurement. In Sample No. 18, two melting points of −20° C. and 56° C. are described because peaks respectively appeared at two points of approximately −20° C. and 56° C. in the DSC pattern. This shows that excess ionic liquid (EMI-TFSI (having a melting point of −17° C.) and the ionic liquid (having a melting point of 56° C.) constituting the composite exist in Sample No. 18.

In Sample No. 19, two melting points of 20° C. and 41° C. are described because peaks respectively appeared at two points of approximately 20° C. and 41° C. in the DSC pattern. One possible reason for this can be inferred that the filling ratio of the ionic liquid (EMI-TFSI) in the structure (MIL-53(Al)) is uneven and hence there are two kinds of crystal structures of the frozen ionic liquid (namely, two kinds of composites exist).

Thus, it was confirmed that in each of Sample Nos. 16 to 20, the composite was formed and the melting point of the ionic liquid was increased than the case of the ionic liquid alone.

Sample Nos. 14 and 15 use, as the porous coordination polymer, MIL-101(Cr) and HKUST-1 each having a coordinatively unsaturated site. These samples include a main chain containing a transition metal. The EMI-TFSI used as the ionic liquid is the ionic liquid that has high degree of dissociation and facilitates individual motion of cations and anions. Thus, when the porous coordination polymer having the coordinatively unsaturated site and slightly low resistance to the ionic liquid and the EMI-TFSI having the high degree of dissociation are mixed together, a large number of anions approach the surroundings of the coordinatively unsaturated site so as to weaken the bond between the metal ion of the porous coordination polymer and the organic ligand of the porous coordination polymer. Moreover, the valence of transition metals contained in the main chain of these porous coordination polymers is variable by contact with the ionic liquid and the crystal structure of porous coordination polymer is variable. It is conceivable that these factors lead to breakage of the porous coordination polymers.

In order to strictly evaluate the melting point, $^{19}$F NMR measurement was conducted. That is, each sample was sealed in Pyrex (registered trademark) glass in a dry argon atmosphere and was measured in a static state at a magnetic field of 9.4 T, frequency of 376.5 MHz, and a temperature of −150 to 30° C.

Figure 7:
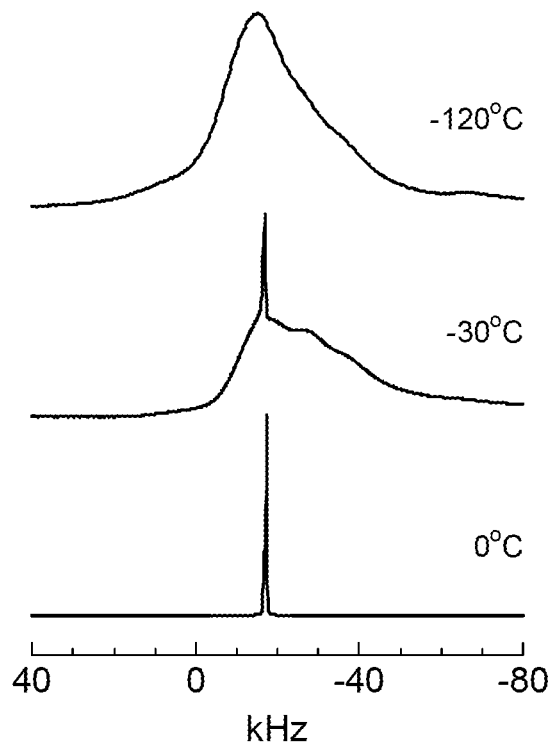
FIG. 7 shows $^{19}F$ NMR spectra of an ionic liquid EMI-TFSI respectively at −120° C., −30° C., and 0° C.

FIG. 7 shows the $^{19}$F NMR spectrum of an ionic liquid EMI-TFSI. It may be considered that the TFSI$^-$ contains fluorine atom, and the $^{19}$F NMR spectrum observes a motional state of TFSI$^-$. A broad peak was observed at −120° C. One possible reason for this is that the EMI-TFSI is frozen and hence the peak is subjected to broadening. When this was heated, a sharp peak appeared at −30° C. One possible reason for this is that the EMI-TFSI is partially melted so as to allow a part of the TFSI$^-$ to be free to move, thus causing motional narrowing for sharpening the peak. When further heated to 0° C., the peak was completely sharpened. This indicates that all the TFSI$^-$ anions are free to move, and all the EMI-TFSI ions have been melted.

Figure 8:
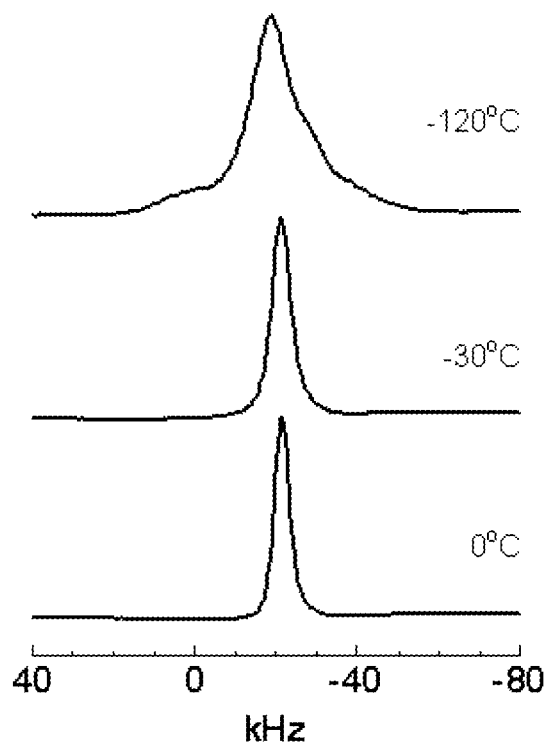
FIG. 8 shows $^{19}F$ NMR spectra respectively at −120° C., −30° C., and 0° C. in a porous coordination polymer-ionic liquid composite produced by mixing a porous coordination polymer ZIF-8 and an ionic liquid EMI-TFSI at a mass ratio of 1:0.24, followed by heating at 200° C. for 15 hours.

FIG. 8 shows the $^{19}$F NMR spectrum of a composite of ZIF-8 and EMI-TFSI. The sample was prepared by subjecting the ZIF-8 to vacuum drying so as to remove guest molecules, then mixing at a mass ratio of ZIF-8:EMI-TFSI=4:1, followed by heating at 200° C. for 15 hours. It may be considered that the ZIF-8 does not contain fluorine atom and hence the $^{19}$F NMR spectrum of FIG. 8 observes a motional state of TFSI$^-$. Unlike the case of FIG. 7, a peak width of the $^{19}$F NMR spectrum is continuously narrowed. This suggests that mobility of the TFSI$^-$ in the pores of the ZIF-8 is continuously increased with temperature, and that a clear melting point has disappeared. If the EMI-TFSI remains outside the pores of the ZIF-8, such a sharpened peak as shown in FIG. 7 should appear. However, such a sharpened peak was not observed. This indicates that all the EMI-TFSI have been trapped in the pores of the ZIF-8.

Figure 9:
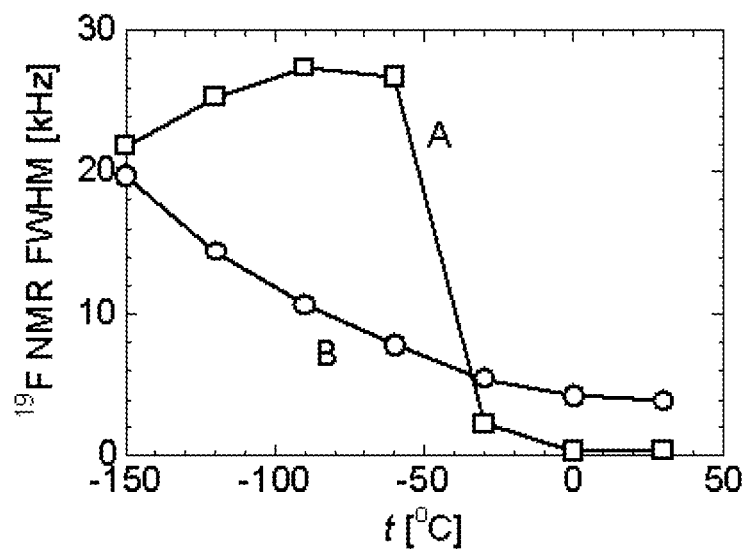
FIG. 9 is a diagram showing temperature dependency of full widths at half maximums in $^{19}F$ NMR spectrum from −150 to 30° C., in which "A" indicates that of an ionic liquid EMI-TFSI, and "B" indicates that of a porous coordination polymer-ionic liquid composite produced by mixing a porous coordination polymer ZIF-8 and an ionic liquid EMI-TFSI at a mass ratio of 1:0.24, followed by heating at 200° C. for 15 hours.

FIG. 9 shows temperature dependency of the full widths at half maximums (FWHM) in the $^{19}$F NMR spectrum of the ionic liquid EMI-TFSI, and the composites obtained from ZIF-8 and EMI-TFSI. The EMI-TFSI of "A" in FIG. 9 had a sharp decrease in the FWHM at approximately −30° C. This is because the peak was sharpened by melting as described above. On the other hand, the composite of the ZIF-8 and the EMI-TFSI of "B" in FIG. 9 had no sharp decrease in the FWHM, and the FWHM was continuously decreased with temperature. This indicates that neither freezing nor melting of the EMI-TFSI was caused by confining the EMI-TFSI in the pores of the ZIF-8. The reason why the FWHM at approximately room temperature is larger than that in the case of EMI-TFSI alone is that the ions of the EMI-TFSI were confined in the pores of the ZIF-8 and the mobility of the ions was slightly deteriorated.

Figure 10:
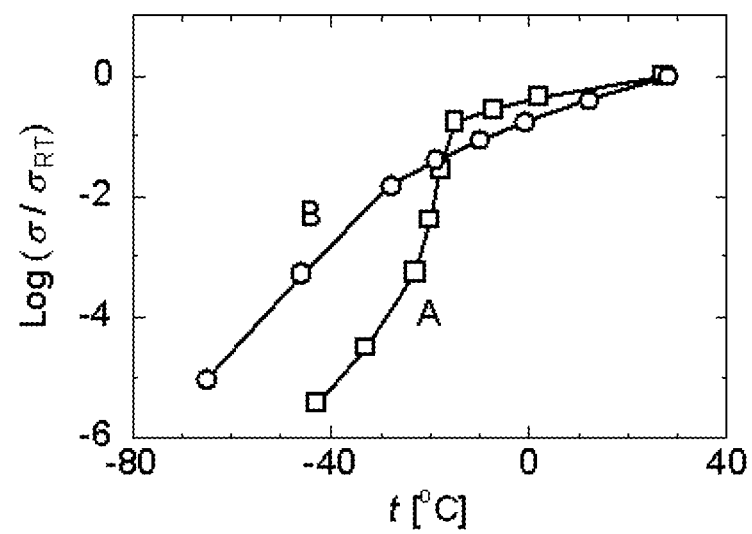
FIG. 10 is a diagram showing temperature dependency of ionic conductivity standardized by a value at room temperature, in which "A" indicates that of an ionic liquid EMI-TFSI, and "B" indicates that of a porous coordination polymer-ionic liquid composite produced by mixing a porous coordination polymer ZIF-8 and an ionic liquid EMI-TFSI at a mass ratio of 1:0.37, followed by heating at 200° C. for 15 hours.

Subsequently, the ionic conductivity of each sample was evaluated. FIG. 10 shows temperature dependency of the ionic conductivity. The value of the ionic conductivity is normalized by a value of ionic conductivity at room temperature. Measurement was made by holding each sample between electrodes made of SUS in a dry argon atmosphere, and the ionic conductivity was evaluated with AC impedance method. Measuring frequency was 1 Hz to 1 MHz.

In FIG. 10, "A" indicates the ionic conductivity of the EMI-TFSI. The used sample was one which was obtained by stacking three pieces of filter paper with a diameter of 3 mm and a thickness of 0.15 mm one upon another, and allowing the EMI-TFSI to permeate the filter paper. The melting point of the EMI-TFSI was −17° C. An abrupt change in ionic conductivity occurred at approximately −17° C. It can be seen from this that the ionic conductivity was extremely low because of freezing at low temperatures while a sharp increase in ionic conductivity occurred at high temperatures due to melting.

In FIG. 10, "B" indicates the ionic conductivity of a composite of ZIF-8 and EMI-TFSI. A mixture was obtained by subjecting the ZIF-8 to vacuum drying so as to remove guest molecules, followed by mixing at ZIF-8:EMI-TFSI=2.7:1 (mass ratio). A sample was prepared by heating the resultant mixture at 200° C. for 15 hours so as to obtain powder of the mixture, followed by subjecting the powder to press forming so as to have a diameter of 3 mm and a thickness of 0.5 mm. Similarly to the FWHM in the $^{19}$F NMR spectrum, the ionic conductivity of the sample was continuously changed with temperature. The ionic conductivity at low temperatures was less deteriorated than that in the case of the EMI-TFSI alone. That is, the composite of the ZIF-8 and the EMI-TFSI is a promising ion conductor that is operable at low temperatures.

Thus, it has been found that the composites of the present invention are configured to retain the ionic liquid in the pores of the porous coordination polymer with the pores of the micropore region so as to significantly decrease the melting point of the ionic liquid, thereby being usable as an electrolyte for a battery or an electrical double-layer capacitor in a wide temperature range equal to or greater than that in the case of using the organic solvent as an electrolyte.

INDUSTRIAL APPLICABILITY

The porous coordination polymer-ionic liquid composite according to the present invention is usable for the purpose of, for example, an electrochemical device. This electrochemical device is obtained by disposing an electrolyte layer containing the composite of the present invention between a pair of electrodes, followed by sealing this into an exterior body.

As an applicable electrode, there are, for example, electrodes containing an active material, such as sintered bodies of an active material, e.g., a metal oxide and a composite oxide; ones which are obtained by solidifying an active material together with a conductive agent by using binder; metals, and carbon-based materials. The electrodes and the composite may be contacted with each other through an electrolyte solution. Preferably, the electrodes and the composite are directly contacted with each other so as to ensure direct ion transfer between the electrodes and the ionic liquid inside the composite (or an ion conductive material).

As the exterior body, ones having generally used shape and material may be used. Alternatively, it is only necessary to coat with insulating resin or the like.

When the melting point of the ionic liquid in the porous coordination polymer-ionic liquid composite according to the present invention is increased than the melting point of the ionic liquid alone, it is applicable to the purpose of leakage prevention as an absorbent for the ionic liquid. General porous absorbents have a possibility that the absorbed ionic liquid leaks again. On the other hand, when the composite of the present invention is formed using a specific porous coordination polymer as an absorbent, the absorbed ionic liquid freezes shortly, thereby further surely preventing the liquid leakage of the ionic liquid.

When the melting point of the ionic liquid in the composite according to the present invention is increased than the melting point of the ionic liquid alone, it is also possible to condense lithium ions in the ionic liquid.

For example, the melting point of the ionic liquid in the composite obtained in the foregoing sample No. 18 is 56° C. and the melting point of the used ionic liquid (EMI-TFSI) is −17° C. In the case where the MIL-53(Al) powder is added in the ionic liquid in which lithium salt is dissolved, and is maintained at approximately 65° C., the ionic liquid in the pores solidifies only when lithium ions enter the pores of the MIL-53(Al) (because the melting point of the ionic liquid increases by dissolution of a large amount of lithium salt). It is therefore ensured to fill the ionic liquid with an enhanced lithium ion concentration with the pores of the MIL-53(Al).

The invention claimed is:

1. A porous coordination polymer-ionic liquid composite comprising:
    a molded body that is an insulating structure, wherein the molded body includes:
        a plurality of particles of a porous coordination polymer, and
        a plurality of voids respectively formed between the particles, wherein at least a part of the plurality of voids comprise an ion conductive material; and
    an ionic liquid retained inside pores of the porous coordination polymer,
    wherein a volume of the ionic liquid with respect to a full capacity of the pores of the porous coordination polymer is 100% or more and less than 200%.

2. An electrolyte comprising:
    an insulating structure composed of:
        a plurality of particles of a porous coordination polymer, and
        a plurality of voids respectively formed between the particles, wherein at least a part of the voids comprises an ion conductive material; and
    an ionic liquid retained inside pores of the porous coordination polymer,
    wherein a volume of the ionic liquid with respect to a full capacity of the pores of the porous coordination polymer is 100% or more and less than 200%.

3. The electrolyte according to claim 2, wherein the porous coordination polymer contains a metal ion as a Lewis acid and an organic ligand as a Lewis base, and the Lewis acid and the Lewis base are any one of a combination of a hard acid and a hard base, a combination of a soft acid and a soft base, and a combination of an intermediate acid and an intermediate base according to HSAB principle.

4. The electrolyte according to claim 2, wherein the porous coordination polymer does not comprise a coordinatively unsaturated site.

5. The electrolyte according to claim 2, wherein the porous coordination polymer comprises a main chain containing a typical metal element.

6. The electrolyte according to claim 5, wherein the typical metal element is Zn or Al.

7. The electrolyte according to claim 2, wherein the insulating structure has a film shape.

8. The electrolyte according to claim 2, wherein the insulating structure has a particle shape.

9. The electrolyte according to claim 2, wherein the insulating structure is a molded body.

10. The electrolyte according to claim 2, wherein the ion conductive material is an ionic liquid.

11. The electrolyte according to claim 2, wherein the ion conductive material is an ionic liquid identical to the ionic liquid retained inside the pores.

12. An electrochemical device comprising a pair of electrodes and an electrolyte according to claim 2 disposed between the electrodes.

\* \* \* \* \*